United States Patent [19]

Nakazawa

[11] Patent Number: 5,216,230

[45] Date of Patent: Jun. 1, 1993

[54] LASER BEAM SCANNER

[75] Inventor: Atsushi Nakazawa, Osaka, Japan

[73] Assignee: Sumitomo Electric Industries, Ltd., Tokyo, Japan

[21] Appl. No.: 816,234

[22] Filed: Jan. 3, 1992

[30] Foreign Application Priority Data

Jan. 9, 1991 [JP] Japan .................................. 3-000985

[51] Int. Cl.⁵ .............................................. G06K 7/10
[52] U.S. Cl. ................................... 235/462; 235/454; 235/467; 235/470; 235/472
[58] Field of Search ............... 235/454, 470, 472, 467, 235/462

[56] References Cited

U.S. PATENT DOCUMENTS

| 4,918,415 | 4/1990 | Hashimoto | 235/454 |
| 4,920,255 | 4/1990 | Gabeler | 235/454 |

FOREIGN PATENT DOCUMENTS

| 2309932 | 11/1976 | France . |
| 54-161346 | 12/1979 | Japan . |
| 62-203117 | 9/1987 | Japan . |
| 2133891 | 5/1990 | Japan . |

Primary Examiner—Harold Pitts
Attorney, Agent, or Firm—Cushman, Darby & Cushman

[57] ABSTRACT

A laser beam scanner for use in a code reader or the like including more than two optical-path-length changing units inserted in the beam path to change the optical path length of the beam between the beam emitting unit and the scanning unit such that the distance from the scanner to the focal point of the beam can be changed. The optical-path-length changing units are controlled by a control unit which receives an output from a distance measuring unit. The distance measuring unit measures the distance from the laser beam scanner to the object to be scanned and indicates to the control unit to adjust the optical-path-length so that the focal point of the beam is at the same distance as the object to be scanned.

4 Claims, 5 Drawing Sheets

LASER BEAM SCANNER

BACKGROUND OF THE INVENTION

1. Field of the Invention

The present invention relates to a laser beam scanner for use in a code reader or the like adapted to optically read a code such as a bar code by scanning the same with a laser beam.

2. Discussion of the Prior Art

Conventionally, code readers have been used which are adapted to optically read a code by scanning with a laser beam a code surface on which a code such as a bar code or a character is formed, and by receiving the light reflected from the code surface by a light-receiving element. An output of the light-receiving element becomes a signal corresponding to the relative strength of the reflected light. In a bar code composed of black bars and white spaces, for instance, a small signal is obtained with respect to a bar, while a large signal is obtained with respect to a space. Accordingly, it is possible to obtain a binary signal corresponding to a bar code if the output of the light-receiving element is, for instance, amplified and is then binarized by being discriminated on the basis of an appropriate slice level.

Although He-Ne lasers were used in the past as light sources for generating laser beams, semiconductor lasers have come to be used in recent years in an attempt to make the overall apparatus compact and lightweight. Since the laser light emitted from a semiconductor laser diffuses remarkably, the output light is normally narrowed down by means of a lens or the like, thereby obtaining a substantially parallel laser beam. For instance, in a case where the code reader is used for reading bar codes, if the bar code has a bar width of 0.2 mm or less, in order to enable the resolution of such a fine-width bar code, it is necessary to narrow the laser light in such a manner that the beam diameter becomes 0.2 mm or less. For this reason, the laser beam used for a bar code reader or the like is not completely parallel light but convergent light having a focal point.

If such a laser beam is used, reading with high resolution is possible in the vicinity of a focal point where the beam diameter is small. In a case where the reading of a code is effected at a position distant from the focal point, the resolution declines. Accordingly, there unavoidably arises the problem that high resolution cannot be ensured over a wide range of reading distance.

A first prior art which is directed to this problem is disclosed in, for instance, Japanese Patent Application Unexamined Publication No. Hei 2-7182, and its basic arrangement is shown in FIG. 6 hereof. Light from a semiconductor laser light source 1 is condensed by a condenser lens 2, thereby forming a laser beam 3. The laser beam 3 has a beam waist BW at a focal position at a distance FL determined by the semiconductor laser light source 1 and the condenser lens 2. If the reading of, for instance, a bar code is effected at the position of this beam waist, reading with a maximum resolution is possible. In this prior art, the arrangement is provided such that the condenser lens 2 is displaced in a direction 4 along the optical axis thereof, whereby the distance FL from the semiconductor laser light source 1 to the focal position is shortened, as shown in FIG. 6(a), or lengthened, as shown in FIG. 6(b).

According to such an arrangement, if the beam waist BW is formed at a position in the vicinity of the code surface in correspondence with a distance from an apparatus body to the code surface where the bar code is formed, the reading of the bar code with high resolution is realized irrespective of the reading distance. As a result, satisfactory reading of a bar code becomes possible in a wide reading range.

A second prior art which is directed to the above-described problem is disclosed in Japanese Patent Application Unexamined Publication No. Hei 2-133891. In this prior art, there are a plurality of laser beam emitting means each constituted by a semiconductor laser light source and a lens, the positions of focal points of the laser beam emitting means are set at mutually different reading distances. This plurality of beam emitting means are used by selecting a beam corresponding to a particular reading distance In such an arrangement as well, it is possible to change the position of the beam waist of the laser beam in correspondence with the reading distance, so that the reading of a code with high resolution can be attained over a wide range of reading.

A third prior art directed to the above-described problem is shown in FIG. 7. A laser beam 12 from a beam emitting means 11 is reflected by a mirror 13A or 13B in its optical path, to a polygon mirror 15 rotatively driven at a constant speed in the direction of arrow 14, and is introduced to a code surface 16. Since the advancing direction of the laser 12 after its reflection changes due to teh rotation of the polygon mirror, the code surface 16 is automatically scanned.

The reflecting mirror 13B which is closer to the beam emitting means 11 is moved into or out of the optical path of the laser beam 12 by an unillustrated driving mechanism, whereby a laser beam 12 can be reflected by the reflecting mirror 13A or by reflecting mirror 13B. As a result, the optical path of the laser beam 12 has two lengths, and thus there are two distances from the apparatus body to a focal position where the beam waist is formed. It goes without saying that if two or more reflecting mirrors are arranged to be insertable between the beam emitting means and the reflecting mirror 13B, more changes in the optical path length become possible. With such an arrangement as well, the reading of codes with high resolution becomes possible in correspondence with various reading distances.

In addition, an arrangement may be alternatively provided such that by modifying the arrangement shown in FIG. 7, one reflecting mirror is used, and this mirror is displaceable from the position of the reflecting mirror 13A to the position of the reflecting mirror 13B. With such an arrangement as well, the position where the beam waist is formed is variable, so that it is possible to operate with various reading distances.

In accordance with the above-described first prior art, the distance FL to the focal position is changed by changing the positional relationship between the semiconductor laser light source 1 and the condenser lens 2. For this reason, in a case where the condenser lens 2 is brought into proximity to the semiconductor laser light source 1 to lengthen the distance FL as shown in FIG. 6(b), the angle $\theta$ at which the laser beam is emitted from the semiconductor laser light source 1 to enter the condenser lens 2 becomes large, so that the beam diameter at the beam waist BW becomes large. In other words, if the distance FL is increased, as shown in FIG. 8, the beam diameter at the beam waist BW increases substantially in proportion to the same. As a result, it becomes impossible to read at a large distance with high resolution.

In addition, in accordance with the above-described second prior art, if an attempt is made to change the focal position in a multiplicity of stages, a multiplicity of beam emitting means including semiconductor laser light sources and lenses are required, resulting in a higher cost. In addition, there is another problem in that a complicated optical arrangement is necessary to ensure that the optical paths of the laser beams from the plurality of beam emitting means coincide with each other.

Furthermore, in accordance with the above-described third prior art, if an attempt is made to change the focal position in, for instance, three stages, a mechanical arrangement for driving two reflecting mirrors is necessary, and a driving mechanism is generally required for individually driving reflecting mirrors and for allowing these reflecting mirrors to be selectively moved into or out of the optical path of the laser beam 12. For this reason, the number of mechanical arrangements increases, so that this prior art is not suitable for adjusting the optical path length in a multiplicity of stages.

In addition, in the arrangement in which one reflecting mirror is continuously placed in the optical path of the laser beam 12, since the operating distance of the reflecting mirror is long, its response characteristic is poor, so that this arrangement is not suitable for practical use.

SUMMARY OF THE INVENTION

Accordingly, an object of the present invention is to provide a laser beam scanner of simplified arrangements capable of sufficiently narrowing the beam diameter of a laser beam on a surface subject to scanning in correspondence with various distances to an object of scanning.

The present invention overcomes the deficiencies of the prior art. Prior Art scanners require many mechanical and optomechanical parts to effect changes in the distance at which the scanner can effectively scan a bar code. Additionally, prior art scanners lack the resolution to scan objects at large distances because the beam waist at the focal point becomes to great to provide a adequate resolution.

The present invention overcomes the above deficiencies by providing a plurality of beam length changing units such that each operated individually will change the beam to a different length. By combining the operation of the individual beam changing units, the beam length can be changed to a number of different lengths greater than the number of beam changing units. Thus, the invented laser beam scanner will have a larger effective reading distance range with fewer beam changing units than the prior art and therefore it will be less expensive to manufacture and maintain the scanner.

Additionally, the beam length changing units are placed in the beam path between the focusing lens and the object to be scanned, thus the characteristics of the focal point will not be changed and the focal point will exhibit the same resolution regardless of the beam length.

DETAILED DESCRIPTION OF THE PREFERRED EMBODIMENTS

Figure 1:
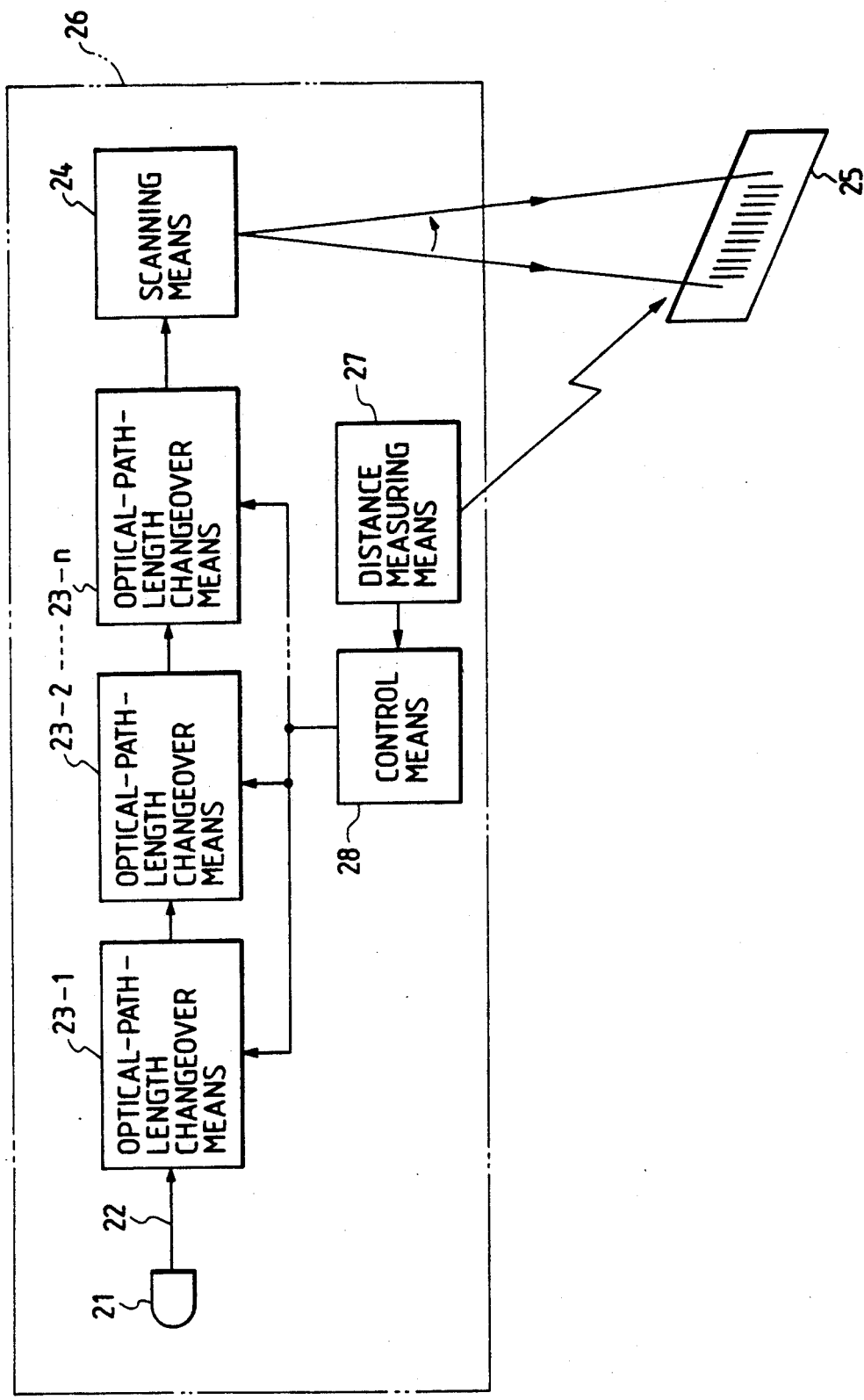
FIG. 1 is a schematic diagram illustrating a basic arrangement of a laser beam scanner in accordance with the present invention.

FIG. 1 is a schematic diagram illustrating a basic arrangement of the present invention. A laser beam 22 generated by a beam emitting means 21 is introduced to a scanning means 24 via optical-path-length changing means 23-1, 23-2, ..., 23-n (n=2, 3, ...). The scanning means 24 changes the direction of the laser beam 22 from the optical-path-length changing means 23-1, 23-2, ..., 23-n, and allows scanning to be effected with respect to an object of scanning 25 with the laser beam 22.

The distance between an apparatus body 26 and the object of scanning 25 is detected by a distance measuring means 27. In response to a detected output of the distance measuring means 27, a control means 28 controls the optical-path-length changing means 23-1, 23-2, ..., 23-n so as to change the optical path length of the laser beam 22 from the beam emitting means 21 to the scanning means 24.

The optical-path-length changing means 23-1, 23-2, ..., 23-n are arranged such that the optical path length of the laser beam from the beam emitting means 21 to the scanning means 24 can be changed in two stages.

It should be noted that each of the optical-path-length changing means 23-1, 23-2, ..., 23-n may comprise optical-path turning-back means for turning back the optical path of the laser beam 22; and a driving mechanism for moving the optical-path turning-back means into or out of the optical path of the laser beam 22.

It is preferred that the lengths of variation of the optical path to be changed by the plurality of optical-path-length changing means 23-1, 23-2, ..., 23-n be mutually different and be set in such a manner that the lengths assume a relationship of being $2^k$-fold a minimum length of variation where k is an integer of 0 or more.

In accordance with the above-described arrangement, the optical path length of the laser beam 22 is selectively varied by the optical-path-length changing means 23-1, 23-2, ..., 23-n on the basis of the distance between the apparatus body 26 and the object of scanning 25, which has been detected by the distance measuring means 27. As a result, the optical path length of the laser beam 22 from the beam emitting means 21 to the scanning means 24 is changed. By changing the optical path length, the distance between the apparatus body 26 and the position where a beam waist is formed in the laser beam 22 is changed. Consequently, an object to be scanned 25 located at various distances from the apparatus body can be scanned with the laser beam 22 narrowed down satisfactorily. Since the position of the beam waist is determined by changing the optical path length, the beam diameter at a beam waist does not change.

In addition, if an arrangement is provided such that the control means 28 individually controls the optical-path-length changing means 23-1, 23-2, ..., 23-n, it is possible to set a number of different lengths equal to or greater than the number of the optical-path-length changing means 23-1, 23-2, ..., 23-n, i.e., a number equal to or greater than n, through a combination of the optical-path-length changing means operated to change the optical path.

For instance, if, in a case where the length of variation $\Delta$ $(=\Delta \times 2^0)$ changed over by the optical-path-length changing means 23-1 is the shortest, the lengths of variation of the optical path changed over by the other optical-path-length changing means 23-2,..., 23-n are set to be $\Delta \times 2^k$ (k=1, 2, ...), it is possible to set $2^n$ optical path lengths for each $\Delta$ by the n optical-path-length changing means 23-1, 23-2, ..., 23-n.

Although each of the optical-path-length changing means 23-1, 23-2, ..., 23-n is arranged by comprising, for instance, the optical-path turning-back means for turning back the optical path of the laser beam 22 and a driving mechanism for moving the optical-path turning-back means into or out of the optical path of the laser beam 22, since more numerous (e.g., $2^n$) optical path lengths than n can be realized by n driving mechanism, the number of mechanical arrangements can be relatively reduced.

A more detailed description will now be given with reference to accompanying drawings 2, 3, 4 and 5 which illustrate the embodiments of the present invention.

Figure 2:
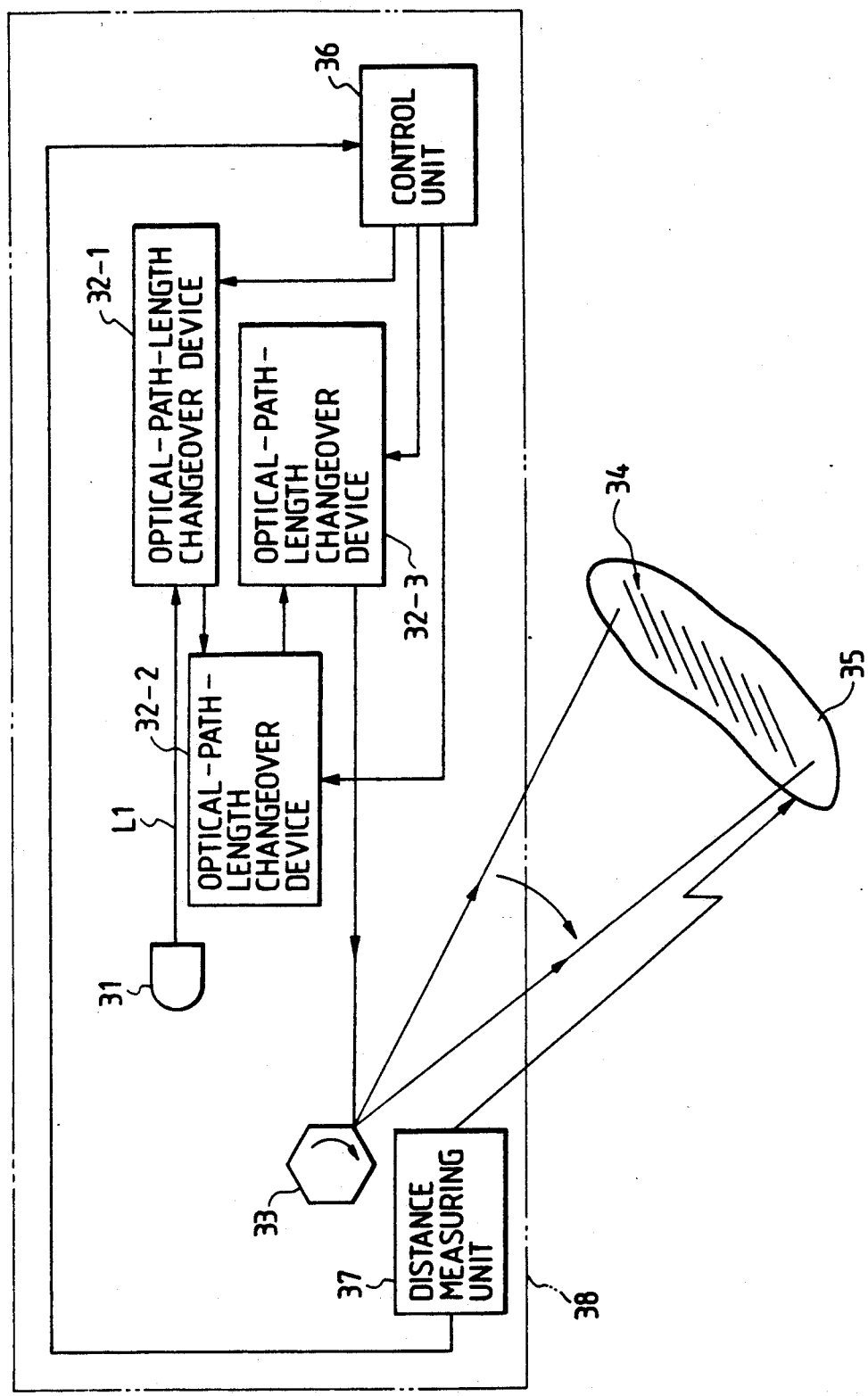
FIG. 2 is a schematic diagram illustrating a basic arrangement of a laser beam scanner in accordance with an embodiment of the present invention.

FIG. 2 is a schematic diagram illustrating a basic arrangement of a laser beam scanner in accordance with a first embodiment of the present invention. This laser beam scanner such as a bar code reader, includes a semiconductor laser light source and a condenser lens, and has a beam emitting unit 31 for emitting a laser beam L1. The laser beam L1 from the beam emitting unit 31 has a focal position at a distance of, for instance, approximately 2.5 m and a beam waist is formed at that position. This laser beam scanner is capable of resolving a bar code composed of bars each having a 0.2 mm width in a range of 5 cm from the focal position.

The laser beam L1 from the beam emitting unit 31 is introduced to a polygon mirror 33, i.e., a scanning means, via optical-path-length changing devices 32-1, 32-2, and 32-3 (referred to as the "optical-path-length changing device 32" when referred to collectively) which will be described later. The polygon mirror 33 is arranged such that each side surface of, for instance, a regular polygon is formed as a deflecting/reflecting surface, and the polygon mirror 33 is rotated by an unillustrated motor about its axis at high speed. As the polygon mirror 33 rotates, the advancing direction of the laser beam L2 changes, with the result that a coded surface 34 is repeatedly scanned.

The reading of the bar code 34 is effected such that light reflected from a code surface 35 is received by an unillustrated light-receiving element, and an output of this light-receiving element, after being amplified is discriminated on the basis of an appropriate slice level and is thereby binarized. For instance, in a case where the bar code 34 is formed by black bars and white spaces, a binary signal "0" is allotted to a bar, while a binary signal "1" is allotted to a space. Thus, binary signals corresponding to the bar code 34 are prepared, and information represented by the bar code 34 is recognized on the basis of the binary signals.

Figure 3:
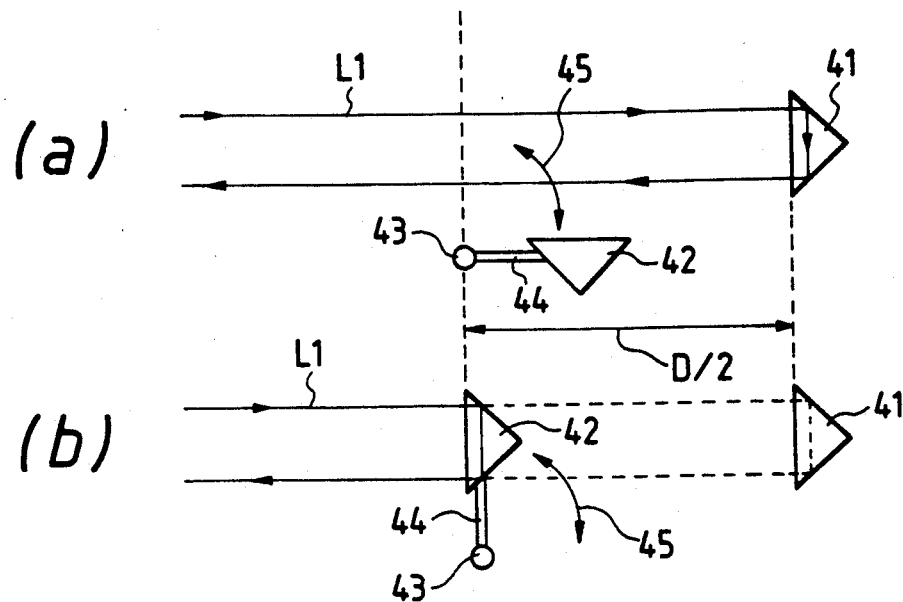
FIG. 3 is a schematic diagram illustrating a configuration of an optical-path-length changeover device 32.

FIG. 3 is a schematic diagram illustrating a basic configuration of the optical-path-length changing device. The optical-path-length changing device has a right-angled prism 41 disposed in a fixed manner and adapted to refract and output the laser beam L1 in a substantially diametrically opposite direction to the direction of incidence. A right-angled prism 42 constituting an optical-path turning-back means capable of being moved into or out of the optical path of the laser beam L1 is provided upstream of the right-angled prism 41 with respect to the direction of incidence of the laser beam L1. This right-angled prism 42 is secured to an axis 43 via a coupling member 44 and is arranged to be angularly displaced by a driving mechanism so that the prism 42 swings into and out of the path of the beam. As a result, a path length change is effected between a state in which the right-angled prism 42 is moved out of the optical path of the laser beam L1, as shown in FIG. 3(a), and a state in which it is inserted in the optical path of the laser beam L1, as shown in FIG. 3(b). In the state in which the right-angled prism 42 is inserted in the optical path of the laser beam L1, as shown in FIG. 3(b), the laser beam L1 is made emergent in a diametrically opposite direction to the direction of its incidence by the right-angled prism 42.

The right-angled prism 42 is disposed at a position where when inserted in the path, the distance to the right-angled prism 41 is D/2 as shown in FIG. 3(b). Accordingly, in the sate in which the right-angled prism 42 is inserted in the optical path, the optical path length of the laser beam L1 is reduced by D.

Referring to FIG. 2, each of the optical-path-length changing devices 32-1, 32-2, 32-3 has a configuration such as the one shown in FIG. 3. In addition, the laser beam L1 made emergent from the optical-path-length changing device 32-1 is introduced to the optical-path-length changing device 32-2, and the laser beam L1 from this optical-path-length changing device 32-2 is introduced to the optical-path-length changing device 32-3, and the laser beam L1 from this optical-path-length changing device 32-3 is introduced to the polygon mirror 33.

In the optical-path-length changing devices 32-1, 32-2, 32-3, the distance D/2 between the right-angled prisms 41 and 42 are set to be 2d, d, and d/2 (e.g., d=10 cm), respectively. That is, the optical-path-length changing devices 32-1, 32-2, 32-3 are capable of varying the optical path length of the laser beam L1 by 4d $(=2^2 \times d)$, $2d (=2^1 \times d)$, and d $(=2^0 \times d)$, respectively.

The respective right-angled prisms 42 in the optical-path-length changing devices 32-1, 32-2, 32-3 are moved into or out of the optical path of the laser beam L1 in response to control signals form a control unit 36 (see FIG. 2). The control unit 36 individually controls the optical-path-length changing devices 32-1, 32-2, 32-3 on the basis of the distance between the apparatus body 38 and the code surface 35, which is measured by a distance measuring unit 37 (see FIG. 2) which will be described later. For instance, the state in which the right-angled prism 42 is inserted in the optical path is defined as the "on" state, while the state in which the right-angled prism 42 is moved out of the optical path is defined as the "off" state. Furthermore, if the optical path length from the beam emitting unit 31 to the polygon mirror 33, in a case where all the optical-path-length changing devices 32-1, 32-2, 32-3 are set in the off state, is L, as the optical-path-length changing devices 32 are changed over by the control unit 36, the optical path length from the beam emitting unit 31 to the polygon mirror 33 can be varied in eight different ways, as shown in Table 1 below.

TABLE 1

| | 32-1 | 32-2 | 32-3 | Optical Path Length |
|---|---|---|---|---|
| 1 | off | off | off | L |
| 2 | off | off | on | L - d |
| 3 | off | on | off | L - 2d |
| 4 | off | on | on | L - 3d |
| 5 | on | off | off | L - 4d |
| 6 | on | off | on | L - 5d |
| 7 | on | on | off | L - 6d |
| 8 | on | on | on | L - 7d |

In this manner, eight optical path lengths can be set by three driving mechanisms for driving the respective right-angled prisms 42 of the optical-path-length changing devices 32-1, 32-2, 32-3. If it is assumed that the optical path length L within the apparatus body 38 is approximately 1 m, and d = 10 cm, the focal position can be changed by 10 cm in the range of 0.8 m–1.5 m from the apparatus body 38. Therefore, if the laser beam has a resolution adequate to resolve a 0.2 mm bar code located within 5 cm of the focal point of the beam, then the effective range of the scanner is 0.75 m–1.55 m from the apparatus body.

Figure 4:
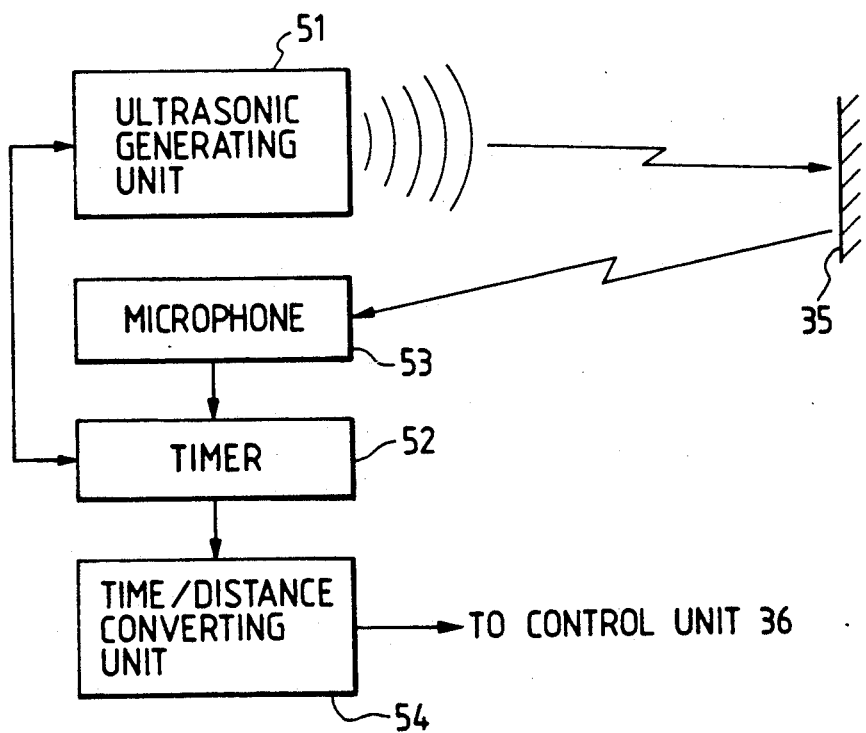
FIG. 4 is a schematic diagram illustrating an example of a configuration of a distance measuring unit 37.

The distance measuring unit 37 is configured as shown in FIG. 4, for example. The distance measuring unit 37 detects the distance from the apparatus body 38 to the code surface 35 by using ultrasonic waves. A timer 52 starts timing synchronously with the generation of ultrasonic waves by an ultrasonic generating unit 51. The ultrasonic waves reflected from the code surface 35 are detected by a microphone 53, and the timer 52 is stopped in response to the same. The distance from the apparatus body 38 to teh code surface 35 is calculated by a time/distance converting unit 54 on the basis of an output of the timer 52, and the calculated result is imparted to the control unit 36.

Figure 5:
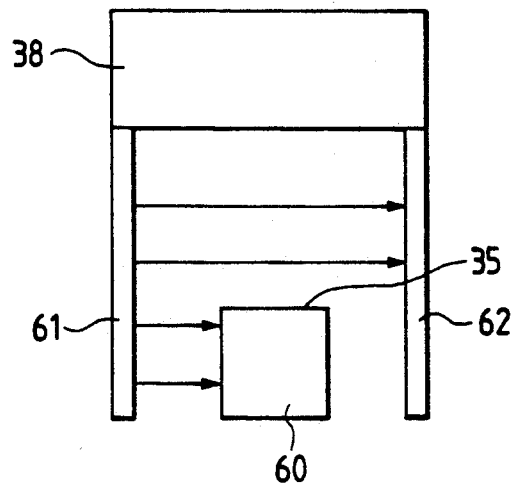
FIG. 5 is a schematic diagram illustrating another example of a configuration of the distance measuring unit 37.
Figure 6:
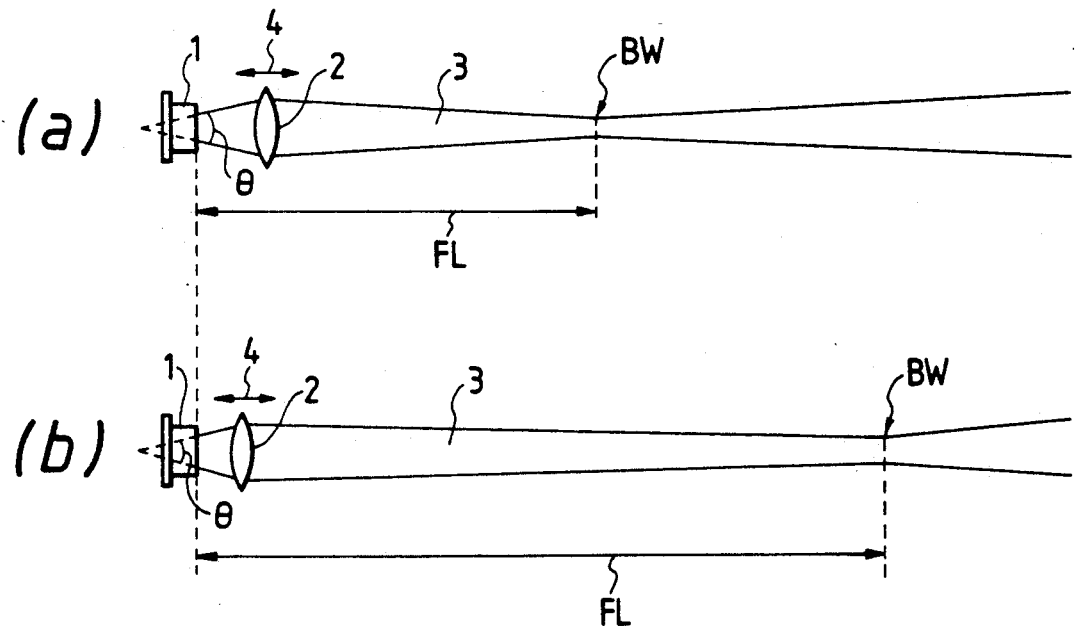
FIG. 6 is a schematic diagram illustrating an arrangement in accordance with a prior art.
Figure 7:
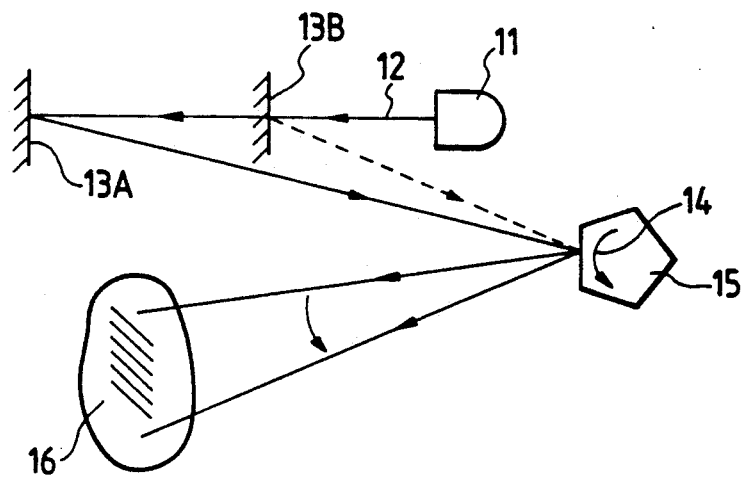
FIG. 7 is a schematic diagram illustrating an arrangement in accordance with another prior art.
Figure 8:
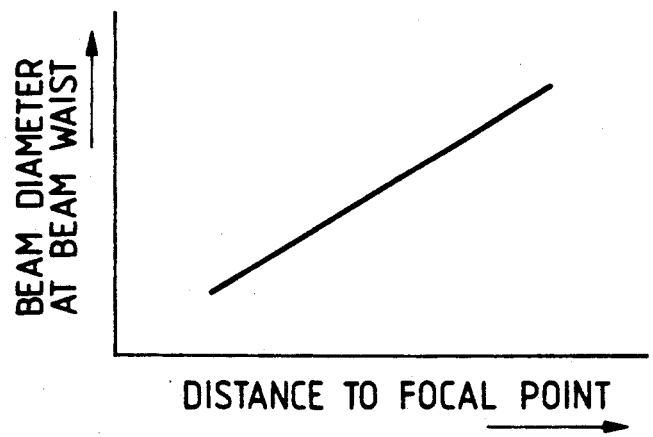
FIG. 8 is a diagram illustrating the relationship between the distance to a focal point of a beam and a beam diameter at a beam waist in accordance with the prior art shown in FIG. 6.

The distance measuring unit 37, may adopt the configuration shown in FIG. 5. In this configuration, a row of light-emitting elements 61 and a row of light-receiving elements 62 are arranged in parallel and extend from the apparatus body 38 toward an object 60 having the code surface 35. When light is generated simultaneously from the row of light-emitting elements 61, since the light-receiving elements constituting the row of light-receiving elements 62 cannot detect light at a portion thereof where the light is shielded by the object 60, the position of the code surface 35 can be specifie.-d by the number of light-receiving elements with the result that the distance from the apparatus body 38 to the code surface 35 can be measured.

As described above, in accordance with the laser beam scanner of this embodiment, the optical-path-length of the laser beam L1 is changed in two stages by the use of the three optical-path-length changing devices 32-1, 32-2, 32-3, respectively. That is, as the optical-path-length from the beam emitting unit 31 to the polygon mirror 33 is changed, the focal position of the laser beam L1 is changed. Accordingly, the beam diameter at the focal position does not change, so that the beam diameter can be narrowed down satisfactorily on the code surface 35.

In addition, the optical-path-length changing devices 32-1, 32-2, 32-3 are individually controlled by the control unit 36, with the result that it is possible to set eight different focal positions by means of the three driving mechanisms, as described before. Accordingly, changing the focal position in a multiplicity of stages can be realized with a smaller number of driving mechanisms and, consequently, the number of mechanical component parts can be relatively reduced, thereby simplifying the arrangement. Moreover, since the optical-path-length is changed by turning on and off the optical-path-length changing devices 32-1, 32-2, 32-3, the optical-path-length can be changed quickly after detection of the distance by the distance measuring unit 37, and the response characteristic is therefore excellent.

Furthermore, the laser beam scanner of this embodiment is less expensive and less complicated to manufacture than prior art because the present invention does not require a complicated optical arrangement or a beam emitting unit for each different focal position.

It should be noted that the present invention is not restricted to the above-described embodiment. For example, although in the above-described embodiment three optical-path-length changing devices are used, it suffices if two or more optical-path-length changing devices are used, as necessary. Furthermore, although in the above-described embodiment the optical-path-length changing device is arranged by using two rightangled prisms, reflecting mirrors may be used instead of the right-angled prisms.

In addition, although in the above-described embodiment a description has been given of a case where the plurality of optical-path-length changing devices are individually controlled by the control unit, an arrangement may be alternatively provided such that a plurality of optical-path-length changing devices are controlled for each predetermined group.

Furthermore, although in the above-described embodiment an example has been cited in which a polygon mirror is used as the scanning means, a galvano mirror or the like may be alternatively used as the scanning means. Moreover, it is possible to adopt one which is adapted to effect multidirectional scan (omni-scan) for effecting scanning in a multiplicity of mutually different directions, or raster scan in which a plurality of parallel scan lines are formed on an object of scanning while a scanning position is being consecutively offset.

Moreover, although in the above-described embodiment a laser beam scanner applied to a bar code reader has been cited as an example, the present invention is readily applicable to other optical code readers such as an optical character reader (OCR).

Various other design changes are possible within the scope in which the gist of the present invention is not changed.

As described above, in accordance with the laser beam scanner of the present invention, the arrangement provided is such that the plurality of optical-path-length changing means for respectively changing the optical-path-length of the laser beam in two stages are interposed between the beam emitting means and the scanning means, and the plurality of optical-path-length changing means are controlled by the control means. Consequently, a changing of the optical-path-length in stages more numerous than the number of the optical-path-length changing means can be realized. In consequence, the number of mechanical arrangements can be relatively reduced. In addition, since the optical-path-length is changed by changing the state of the optical-path-length changing means by the control means, the response characteristic is excellent.

In addition, the arrangement provided is such that the distance between the apparatus body to the focal position of the beam is varied by changing the optical path length between the beam emitting means and the scanning means so as to cope with objects located at various distances. Therefore, it is possible to apply a satisfactorily narrowed-down laser beam to the surface of a distant object. As a result, objects located at various distances from the apparatus body can be scanned satisfactorily.

What is claimed is:

1. A laser beam scanner comprising:
   beam emitting means for emitting a laser beam;
   scanning means for scanning an object with the laser beam emitted from the beam emitting means;
   distance measuring means for detecting a distance between the laser beam scanner and the object;
   a plurality of optical-path-length changing means interposed between the beam emitting means and the scanning means and adapted to change an optical-path-length of the laser beam from the beam emitting means to the scanning means; and
   control means for controlling the optical-path-length changing means on the basis of the distance detected by the distance measuring means.

2. A laser beam scanner according to claim 1, wherein each of the optical-path-length changing means comprises:
   optical-path turning-back means for turning back the optical-path of the laser beam; and
   a driving mechanism for moving the optical-path-turning-back means into or out of the optical-path of the laser beam.

3. A laser beam scanner according to claim 1, wherein the lengths of variation of the optical-path-length changed by each of the plurality of optical-path-length changing means are mutually different.

4. A laser beam scanner according to claim 3 wherein the length of variations of the optical-path-length changed by each of the plurality of optical-path-length changing means are set in such a manner that the lengths assume a relationship of being $2^k$-fold a minimum length of variation where k is an integer of 0 or more.

* * * * *